Patented Nov. 10, 1942

2,301,381

UNITED STATES PATENT OFFICE 2,301,381

AMINO DERIVATIVES

Joseph B. Dickey and James G. McNally, Rochester, N. Y., assignors to Eastman Kodak Company, Rochester, N. Y., a corporation of New Jersey No Drawing. Application November 25, 1939, Serial No. 306,202

6 Claims. (Cl. 95—88)

This invention relates to new amino derivatives and particularly to new derivatives of aminophenol, phenylenediamine and the like, which compounds are particularly useful for photographic purposes.

Various amines are known and used industrially. However, certain amines as for example some of the diamines, have not been extensively used because of their adverse solubility and physiological characteristics. It is therefore apparent that the development of the new amines which have improved solubility properties is a highly desirable result.

We have found certain new amino derivatives which possess improved solubility and other advantages rendering them particularly suitable for photographic uses.

This invention has for one object to provide new amino compounds which are particularly useful for photographic purposes, either in black and white or color processes, the preparation of indophenol, azo, and anthraquinone dyes. Still another object is to provide new derivatives of aminophenols, phenylenediamine, substituted phenylenediamines and the like, which possess certain improved characteristics. A still further object is to provide new aryl derivatives which contain at least one hydroxy or amino group in the molecule and at least one pyridine group, i. e. a group containing a pyridine nucleus which may be substituted e. g. with a fused-on benzene ring. A still further object is to provide a novel photographic developer including in its composition an aryl derivative having a pyridine group in its molecule and at least one hydroxy or amino group. A still further object is to provide methods for the production of the aforementioned compounds. Other objects will appear hereinafter.

We have found that new amino compounds, particularly useful as photographic developers in either black or white or color processes, may be prepared having the general formula:

wherein X represents phenylenediamine, a subtuted phenylenediamine, an aminophenol, or other aryl radicals, such as anthracene, $R^1$, $R^2$, $R^3$ and $R^4$ represent a variety of radicals and elements such as alkyl, halogen, pyridine, sulfonic acid, phosphate and the like, as will be more apparent as the description proceeds. Preferably, our compounds will include a pyridine group in the molecule, as will be disclosed in some of the examples.

As already indicated, our new compounds are useful industrially inasmuch as they may be used as water-soluble photographic developers, in the preparation of indophenol, azo and anthraquine dyes. The term "photographic developer" is used in a broad sense. That is, we contemplate the use of our new amino compounds in the formation of a photographic image whether formed by the precipitation of silver or the formation of a colored organic compound by the reaction with suitable so-called couplers in the presence of an oxidizing agent as in the various photographic color processes.

Details respecting our invention will be further apparent from the following specific examples which are set forth primarily for the purposes of illustration of the preferred embodiments.

*Example 1*

One mole of

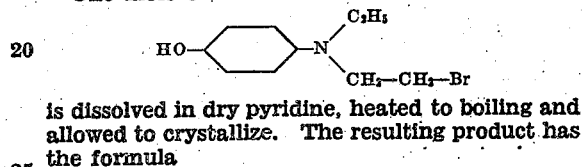

is dissolved in dry pyridine, heated to boiling and allowed to crystallize. The resulting product has the formula

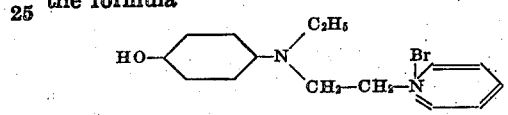

Similarly there may be prepared:

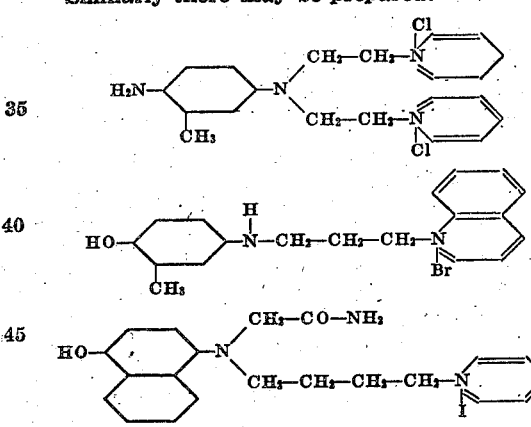

*Example 2*

One mole of:

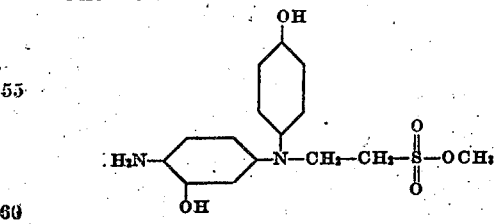

is heated with pyridine and on cooling allowed to crystallize. The product has the formula:

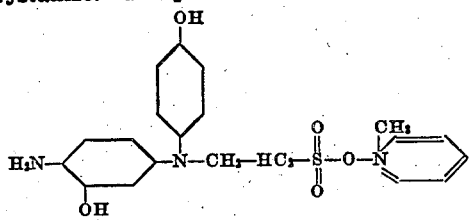

Similarly there may be prepared:

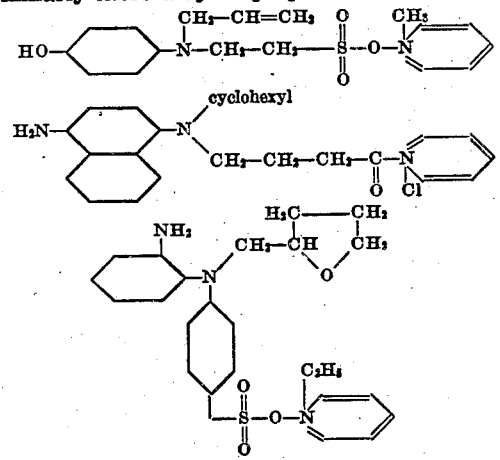

Example 3

One mole of

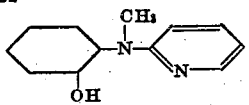

is heated with an excess amount of methyl-p-toluenesulfonate. When the reaction is complete the product is allowed to cool and is crystallized from alcohol or acetone. The product has the formula:

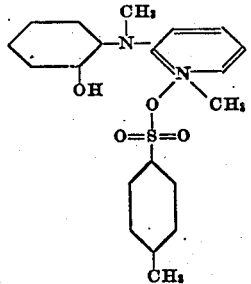

Similarly there may be prepared:

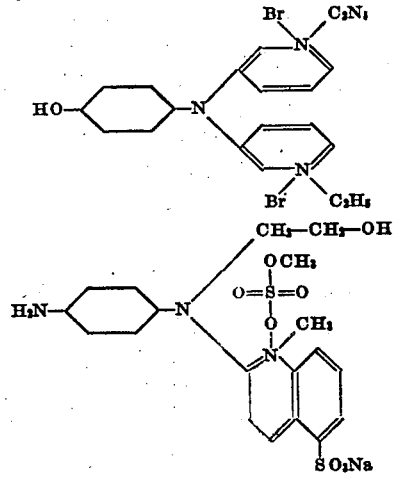

Example 4

One mole of

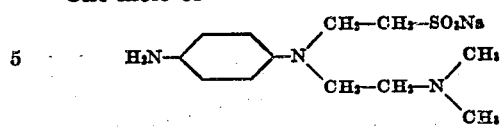

is treated with one mole of methyl iodide in alcohol. The reaction product has the formula:

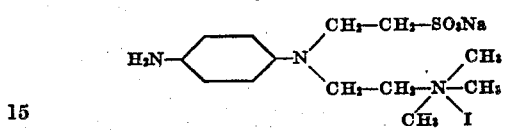

Similarly we may prepare:

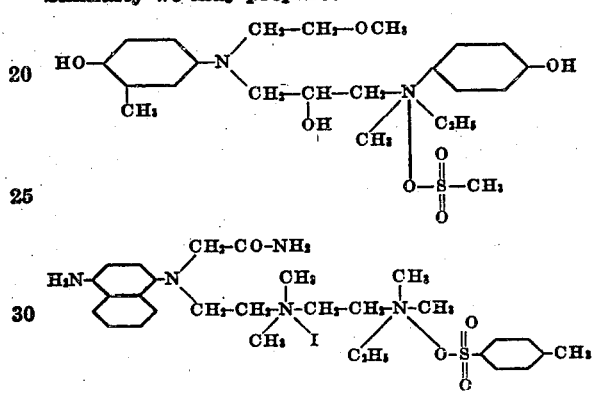

Example 5

One mole of

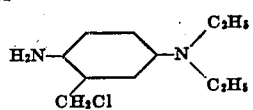

is treated with an excess of triethylamine. The product has the formula:

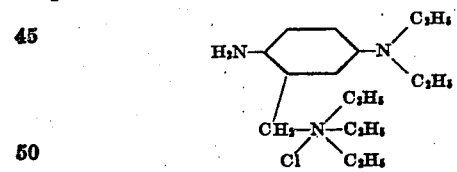

Similarly there may be prepared:

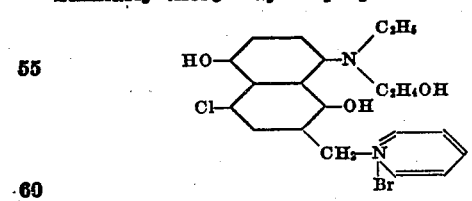

In place of the halogen atom, for example, we may have:

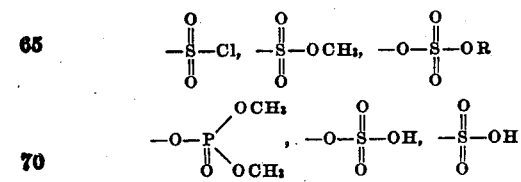

The starting compounds referred to in the examples may be obtained in various ways. For example, the methoxy sulfonate derivative of Example 2 may be obtained as follows: β-bromoethane sulfonate is treated with PCl₅ and distilled and then etherified with methanol to give

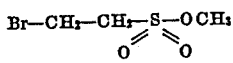

This compound is then heated with:

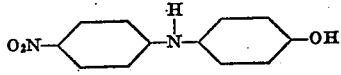

and reduced with nickel and hydrogen to give the compound described. Most of the starting materials are common to the literature as for example:

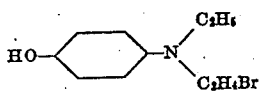

which is prepared by the action of ethylene bromide on ethyl-p-aminophenol.

Our novel compounds preferably will comprise an aryl nucleus containing at least one radical from the group consisting of hydroxy and NH₂. The aryl nucleus may be an anthracene ring but preferably we prepare the derivatives of phenylenediamine and aminophenol. In some instances the aryl nucleus may be further substituted by a monovalent substituent as for example a methyl group attached to the ring. As indicated in the examples, at least one of the amino groups may include a quaternary ammonium group. In certain of our preferred phenylenediamine compounds a pyridine group is included in the molecule at the various points indicated in the preceding examples.

Because of the improved solubility characteristics possessed by our new compounds, our compounds are particularly useful as a component of water-soluble photographic developers. However, as indicated, our compounds may be used in the preparation of dyes and for other industrial purposes.

From the foregoing, it is apparent that our invention is susceptible of some modification; hence, we do not wish to be restricted, excepting insofar as may be necessitated by the prior art and the spirit of the appended claims.

By the term alkyl we mean an alkyl group of the formula $C_nH_{2n+1}$ wherein $n$ represents an integer.

What we claim and desire to be secured by Letters Patent of the United States is:

1. A photographic developer which contains as an essential ingredient a substantial amount of a compound having the formula:

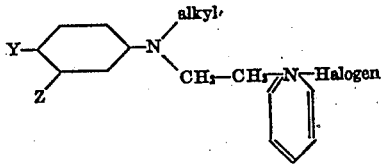

wherein Y represents a radical from the group consisting of NH₂ and OH, and wherein the benzene group may have attached thereto at Z a member from the group consisting of hydrogen, hydroxy, alkyl, halogen, and substituted alkyl.

2. A photographic developer which contains, as an essential ingredient, a substantial amount of a compound having the formula:

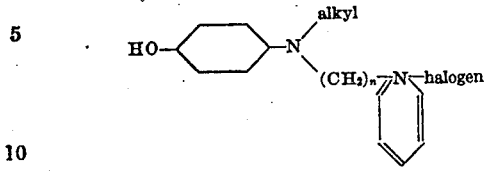

wherein $n$ represents an integer less than 6.

3. A color photographic developer which includes as an essential ingredient a compound having the formula:

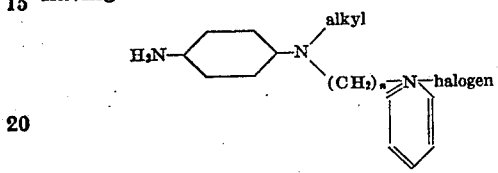

wherein $n$ represents an integer less than 6.

4. A photographic color developer which includes as an essential ingredient a substantial amount of a compound having the structure:

wherein R' is an alkylene group having a quaternary ammonium radical attached to a carbon atom of said alkylene group and R is a member from the group consisting of hydrogen, lower alkyl, lower aliphatic acyl, aryl, heterocyclic and R'.

5. A photographic developer which includes as an essential ingredient a substantial amount of the compound having the formula:

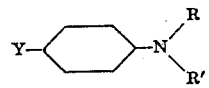

wherein R' is an alkylene group having a quaternary ammonium radical attached to a carbon atom of said alkylene group, R is a member from the group consisting of hydrogen, lower alkyl, lower aliphatic acyl, aryl, heterocyclic and R', and Y represents a radical from the group consisting of NH₂ and OH.

6. A photographic developer which includes as an essential ingredient a substantial amount of the compound having the formula:

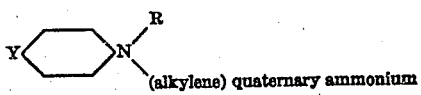

wherein R is a member from the group consisting of hydrogen, lower alkyl, lower aliphatic acyl, aryl, heterocyclic and R', and Y represents a radical from the group consisting of NH₂ and OH.

JOSEPH B. DICKEY.
JAMES G. McNALLY.

CERTIFICATE OF CORRECTION.

November 10, 1942.

Patent No. 2,301,381.

JOSEPH B. DICKEY, ET AL.

It is hereby certified that error appears in the printed specification of the above numbered patent requiring correction as follows: Page 1, first column, line 42, for "black or" read --black and--; page 2, first column, line 9, for that portion of the formula reading "$HC_2$" read --$CH_2$--; line 56, for that portion of the formula reading "$C_2N_5$" read --$C_2H_5$--; and that the said Letters Patent should be read with this correction therein that the same may conform to the record of the case in the Patent Office.

Signed and sealed this 9th day of February, A. D. 1943.

Henry Van Arsdale,
Acting Commissioner of Patents.

(Seal)